Sept. 15, 1970    L. R. SITNEY    3,528,245
COMBINED RADIOISOTOPE POWER AND PROPULSION SYSTEM
Filed May 27, 1968    3 Sheets-Sheet 1

INVENTOR.
LAWRENCE R. SITNEY
BY Harry A. Herbert Jr
Jacob N. Erlich and
ATTORNEYS Sept. 15, 1970  L. R. SITNEY  3,528,245
COMBINED RADIOISOTOPE POWER AND PROPULSION SYSTEM
Filed May 27, 1968  3 Sheets-Sheet 2
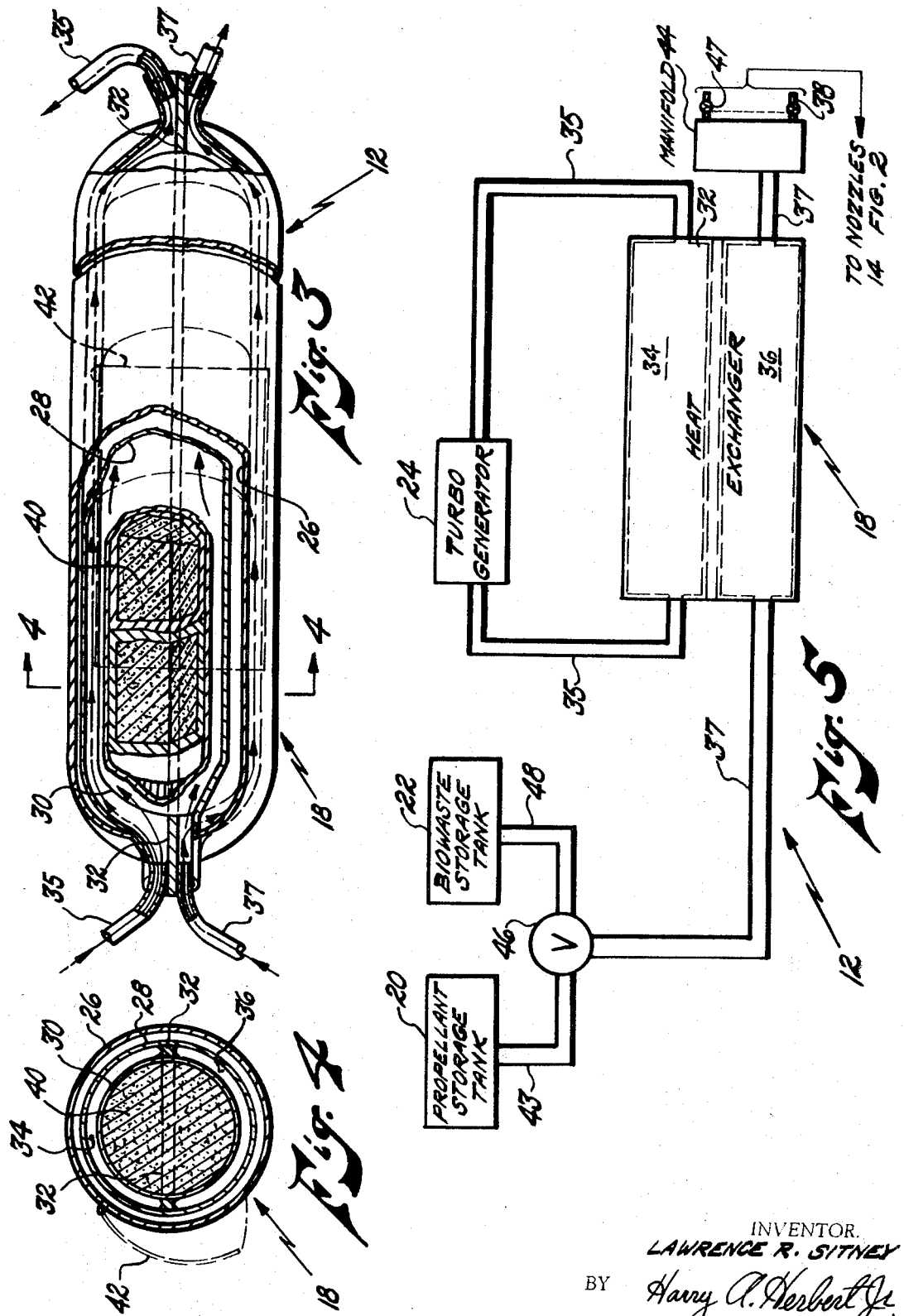
INVENTOR.
LAWRENCE R. SITNEY
BY Harry A. Herbert Jr.
Jacob N. Erlich and
ATTORNEYS Sept. 15, 1970  L. R. SITNEY  3,528,245
COMBINED RADIOISOTOPE POWER AND PROPULSION SYSTEM
Filed May 27, 1968  3 Sheets-Sheet 3

INVENTOR.
LAWRENCE R. SITNEY
BY Harry A. Herbert Jr.
Jacob N. Erlich and
ATTORNEYS

United States Patent Office 3,528,245
Patented Sept. 15, 1970

3,528,245
COMBINED RADIOISOTOPE POWER AND PROPULSION SYSTEM
Lawrence R. Sitney, 30440 Oceanaire Drive,
Palos Verdes Peninsula, Calif. 90274
Filed May 27, 1968, Ser. No. 732,340
Int. Cl. G21d 5/00; G21h 1/00
U.S. Cl. 60—203                                         3 Claims

ABSTRACT OF THE DISCLOSURE

A combined power and propulsion system for a manned space vehicle which utilizes the heat generated by a radioisotope heat source for heating a working fluid and a propellant. The above system is also capable of exhausting biowaste products in order to achieve additional useful thrust and to further enhance the spacecraft performance.

BACKGROUND OF THE INVENTION

This invention relates generally to a combined power system and gas rocket engine or propulsion system for space vehicles and more particularly, to a direct cycle power and propulsion system which employs an encapsulated radioisotope to (1) heat a working fluid to an elevated temperature and then use the hot gases to drive a turbogenerator in a closed system to produce power for the space vehicle, and (2) heat another fluid to an elevated temperature and then expel the hot gas through a nozzle to provide for propulsion of the space vehicle.

Presently contemplated manned space vehicles require electrical power for operation of the mission equipment as well as life support and also involve some propulsive maneuvers by the vehicles. These maneuvers, whether for the purposes of prime propulsion, attitude control, or trajectory alteration, typically call for variable impulse and multiple restart capabilities in rockets. In such cases the space vehicle carries an independent power system for mission equipment operation and for life support and requires large amounts of propellant or fuel for propulsion. Therefore, the above situation tends to create a formidable storage and weight problem in the vehicle.

The majority of rocket propulsion systems in current use utilize chemical energy to provide the heat for the working fluid. These systems are characterized by relatively low thruster specific weights of approximately 0.02 lb. m./lb. f., but have a maximum potential specific impulse of approximately 450 lb. f.-sec./lb. m. Various high specific impulse electric propulsion systems are currently being developed, including are jets, plasma jets and ion engines. While these systems have very high specific impulse from 1,000 to 10,000 lb. f.-sec./lb. m. the total weight of the power supply and engine is relatively high resulting in specific weights of more than 2,000 lb. m./lb. f. It is quite obvious that neither the chemical nor electrical propulsion systems can simultaneously provide both high specific impulse and low propulsion system weight.

It has therefore been found that a radioisotope rocket engine for space vehicles is most desirable since it provides a relatively high specific impulse of 700 to 800 lb. f.-sec./lb. m. or higher with a relatively low specific thruster weight of approximately 20–50 lb. m./lb. f. The radioisotope rocket engine comprises essentially of one or more encapsulated radioisotope heat sources located in the geometric center of the rocket engine and surrounded by a housing forming a flow channel or fluid passage around the capsule. One end of the housing is connected to a propellant line extended from a propellant storage tank which is preferably filled with a fluid, such as hydrogen ($H_2$) or other suitable propellants, such as $N_2H_4$, $NH_3$ or $H_2O$. The fluid in the propellant storage tank preferably receives sufficient heat to generate vapor pressure within the storage tank which is sufficient to force the fluid out of the tank and through the fluid passage, where heat is transferred to the fluid by conduction through the walls of the capsule and then by convection and radiation to the gas which is formed by vaporization of the working fluid at the entrance end of the thruster. The gas is superheated to higher and higher temperatures as it flows through the engine and out of a nozzle formed at the opposite end of the housing. Although the above type system eliminates many of the past drawbacks, it still has the following shortcomings:

(1) In order to maintain the desired operating temperature within the engine during maximum flow of the propellant fluid an external radiation shield is provided in spaced relationship around the housing of the engine. During throttled or no flow conditions the temperature control may be maintained by passive temperature control utilizing thermal radiation from the outer radiation shield which is immovable with respect to the heat source or by active temperature control utilizing suitable means for operating a clam shell or louvered type of radiation shield which when open permits radiation directly from the housing. In other words, it is necessary to operate the above system with a continuous flow of propellant for cooling, or the radiation shield must be removable to permit radiation directly from the housing to the atmosphere.

(2) The power system of such a space vehicle must be made up of an independent power source and working fluid.

(3) The space vehicle must have independent means capable of exhausting the biowaste products from the spacecraft environmental control and life support system.

SUMMARY OF THE INVENTION

Future manned space activity can be conducted economically only if the space vehicle can be maintained in space for periods of months or years by means of crew rotation and resupply with the resupply interval being as long as possible, typically a minimum of two to three months. Such long life space vehicles are feasible only if the power system is nuclearly or solar energized. Current analyses indicate that a radioisotope-energized Brayton power system is the most cost-effective power system for such a manned space vehicle. Once such a power system is included in the space vehicle, further economies in manned space operations can be achieved by using the radioisotope to heat a propellant to provide propulsive thrust with a high specific impulse. Such a combined radioisotope power and propulsion system minimizes the storage volume and weight requirements for the space vehicle and results in an optimum power and propulsion system for the vehicle. This invention describes such a combined power and propulsion system.

The instant invention utilizes heat generated by the radioisotope heat source of a combined dynamic radioisotope power and propulsion system to heat a working fluid (such as helium and xenon) and a propellant (such as hydrogen, ammonia, a low molecular weight hydrocarbon or biowaste products) in a dynamic conversion cycle heat exchanger. The working fluid is used to generate electrical power in a closed loop for power in the space vehicle while the propellant is exhausted to space through a plurality of nozzles to obtain thrust. Such a system could improve overall systems performance of a manned spacecraft employing a dynamic (i.e., Brayton cycle) radioisotope power system by reducing the weight of the propulsion system required to meet the spacecraft primary and/or secondary propulsion requirements.

The instant invention has the advantage of combining two separate spacecraft systems (power and propulsion)

into a single optimized system, resulting in savings in the on-orbit spacecraft weight and reducing the logistics and operational costs of the spacecraft. Significantly higher specific impulse (greater than 500 sec.) would be attainable with hydrogen propellant using this system than with any workable chemical monopropellant or bipropellant propulsion system.

In addition to the use of stored propellants, the proposed invention may be capable of exhausting biowaste products from the spacecraft environmental control and life support system through the propulsion system to achieve useful thrust and to further improve spacecraft performance. These biowaste products could be carbon dioxide and water from the atmospheric control system or a hydrocarbon such as methane or acetylene produced by the regeneration of oxygen from the biowaste products.

More specifically, in conjunction with the instant invention, the spacecraft propulsion system uses clusters of nozzles located around the periphery of the spacecraft to produce thrust to control spacecraft pitch, yaw and roll, and to impart translational movement to the spacecraft for maneuvering purposes. A typical system of the instant invention might employ four clusters of four nozzles each. For such a system, two or more properly sized heat exchanger tubes may be added to the basic heat exchanger for the dynamic power conversion unit. The heat exchanger tubes would be attached to a manifold on the hot side of the heat source. Each of the heat exchanger tubes from the manifold would have a solenoid actuated valve controlling the gaseous flow into the tube from the manifold such that flow would be only through the tube or tubes required for propulsion functions at a specific instant.

An additional use of the combined radioisotope power and propulsion system of the present invention would be to provide a power flattening load to the power system. In other words, it would be unnecessary to dump excess heat to the atmosphere during throttled or no flow conditions. For example, this would be accomplished in two ways. Primarily, the propulsion system will require the maximum amount of heat for maneuvering, during which time the spacecraft power requirements will be at their lowest level; this would permit the power system to operate at lower power without the need to dump the excess heat to space. Also, it can use unneeded electrical energy to operate a refrigeration system to keep the propellant sufficiently cold to minimize boil off losses.

It is therefore an object of this invention to provide a combined radioisotope power and propulsion system.

It is a further object of this invention to provide a combined radioisotope power and propulsion system which is of light weight and reduces storage problems.

It is still a further object of this invention to provide a propulsion system which is capable of exhausting biowaste products from the spacecraft.

It is another object of this invention to provide a combined power and propulsion system which may be operated with a minimum amount of heat radiated to the atmosphere during the throttled or no flow condition.

For a better understanding of the present invention, together with other and further objects thereof, reference is had to the following description taken in connection with the accompanying drawings and its scope will be pointed out in the appended claims.

DESCRIPTION OF THE DRAWINGS

FIG. 3 represents a semi-schematic fragmentary side elevational view of the heat exchanger of this invention partly in cross section;

FIG. 4 represents a cross sectional view of the heat exchanger of FIG. 3, taken along lines 4—4;

FIG. 5 is a block diagram of the combined power and propulsion system of this invention.

DESCRIPTION OF THE PREFERRED EMBODIMENTS

Figure 1:
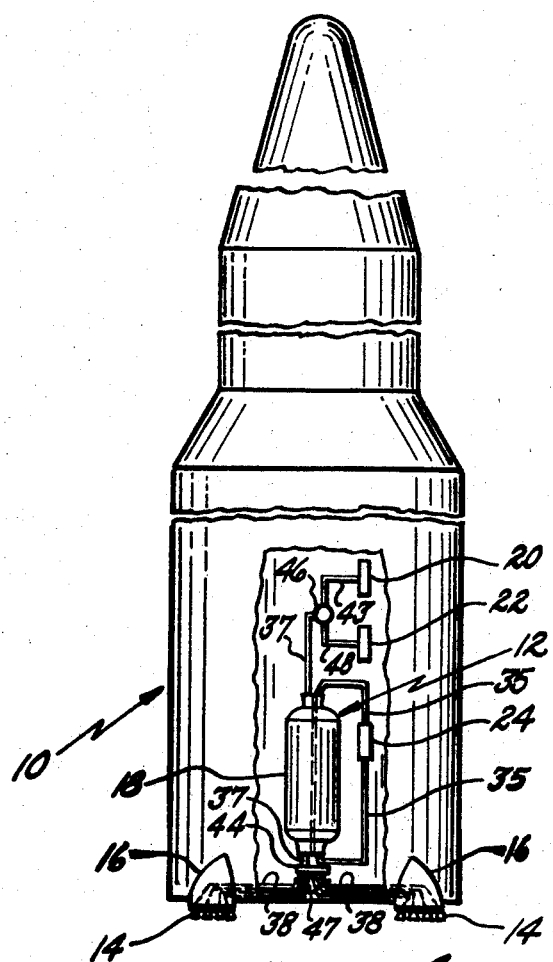
FIG. 1 represents a fragmentary side elevational view of the space vehicle showing the combined power and propulsion system of this invention.
Figure 2:
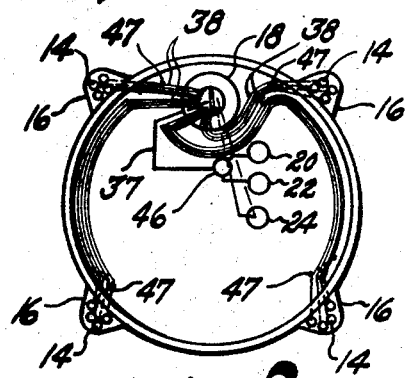
FIG. 2 represents the bottom of the space vehicle showing the nozzles and the exchanger tubes leading thereto.

For a more detailed description of the instant invention reference is made to FIGS. 1 and 2, wherein is shown a conventional space vehicle 10 which is to be powered and propelled by the combined radioisotope power and propulsion system 12 of the instant invention. The combined power and propulsion system 12 is located in the rear portion of the vehicle 10. A plurality of propulsion nozzles 14 (see FIG. 2) are located within nozzle housings 16 and are connected to the heat exchanger 18 of the system of this invention by a plurality of secondary heat exchanger tubes 38. The secondary heat exchanger tubes 38 are connected to a manifold 44 which in turn is connected to a main heat exchanger tube 37 (shown in FIG. 3). The primary propellant such as hydrogen, ammonia or a low molecular weight hydrocarbon is supplied to the heat exchanger 18 by tube 37 from a propellant storage tank 20 while an alternate or secondary supply of propellant, in the form of biowaste products from the spacecraft environmental control and life support system, is supplied to the heat exchanger 18 from a biowaste storage tank 22. The biowaste products could be carbon dioxide and water from the atmospheric control system or a hydrocarbon such as methane or acetylene produced by the regeneration of oxygen from the biowaste products.

The power system of the space vehicle 10 operates from a closed loop of working fluid such as helium and xenon which is supplied to heat exchanger 18 through heat exchanger tube 35 from turbogenerator 24.

For a more detailed description of the combined power and propulsion system 12 of the instant invention, we now refer to FIGS. 3 and 4 wherein is shown one form of the instant invention. The heat exchanger 18 is made up of an outer radiation shield 26 concentric with an outer shell 28 to provide an annular space therebetween. An inner shell 30 is mounted in concentric spaced relation to the outer shell 28 by a spacing element 32 to provide two separate flow channels or fluid passages 34, 36, respectively. One of the passages 34 is connected to the turbogenerator 24 in a closed loop by heat exchanger tube 35, while the other passage 36 contains main heat exchanger tube 37. Heat exchanger tube 37 is connected at the hot end to manifold 44 while being connected at the cold end to a two-way valve 46 and tanks 20 and 22 (shown in FIG. 5). The inner shell 30 encloses a heat source 40 made up of a radioisotope such as plutonium oxide ($Pu^{238}{}_2O_3$). The outer radiation shield 26 is further provided with a movable outer portion 42 which may be in the form of louvers or a clam-type door and which is capable of being opened and closed as required in an emergency condition when it becomes necessary to radiate excess heat to the atmosphere. Although only one such heat exchanger 18 is shown any suitable number may be used.

Figure 6:
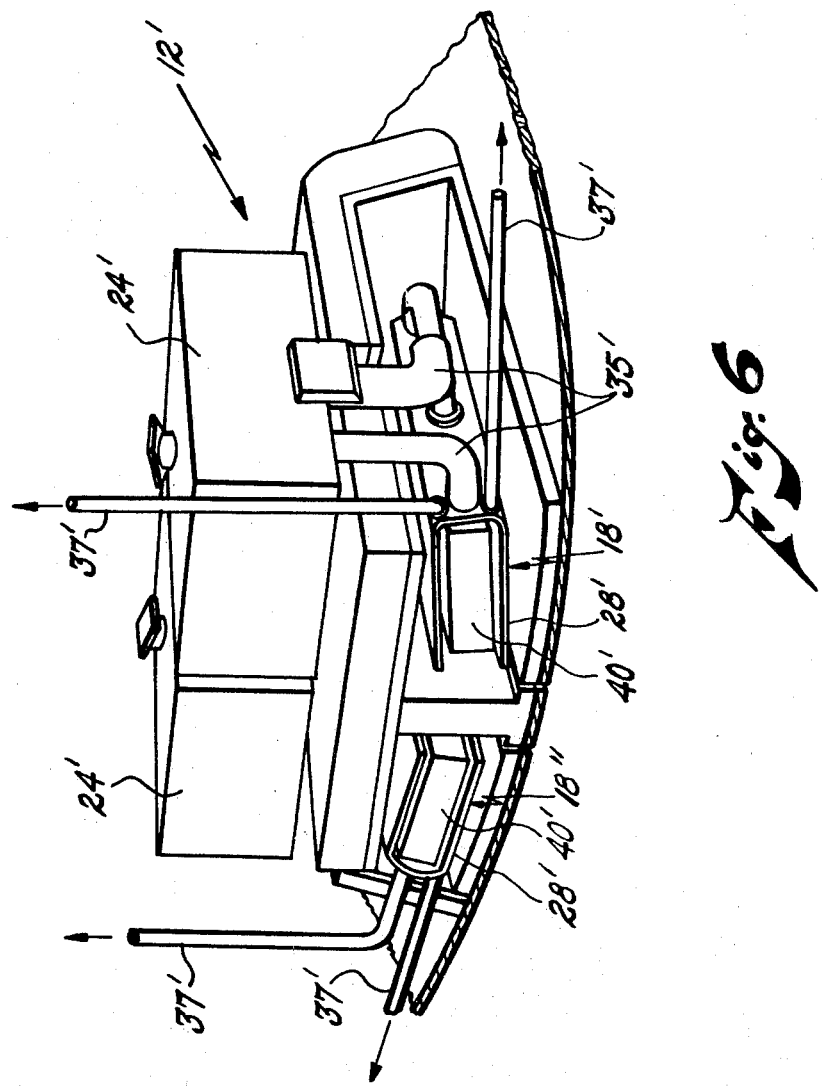
FIG. 6 represents a fragmentary perspective view of a modified power and propulsion system of this invention.

Reference is now made to a modified power and propulsion system 12' shown more clearly in FIG. 6. The heat exchanger 18' is of a rectangular configuration and has an outer shell 28' which encloses three sides of a radioisotope source 40'. The fourth side of the exchanger 18' being made available for louvers (not shown) for the rejection of excess heat to space if necessary. The heat exchanger 18' is further made up of two passages. One of the passages is connected to the turbogenerator 24' in a closed loop by heat exchanger tube 35', while the other passage contains propellant heat exchanger tube 37'. Propellant heat exchanger tube 37' is connected at the hot end to manifold 44 and at the cold end to the two-way valve 46 (shown in FIG. 5). Although the above description refers to only one heat exchanger 18', a second redundant system may be used as shown by duplicate heat exchanger 18''.

Reference is now made to the block diagram of FIG. 5, wherein the numerals therein represent the power and propulsion system 12 of this invention utilizing the heat exchanger 18 shown in FIGS. 3 and 4. It should be noted, however, that the block diagram of FIG. 5 is also representative of the modified power and propulsion system 12' of this invention utilizing the heat exchanger 18', and the following description should be read with this in mind.

The working fluid such as helium and xenon flows through tube 35 in a closed loop through passage 34 of heat exchanger 18, to the turbogenerator 24, and back to the heat source.

The propellant such as hydrogen, ammonia or a low molecular weight hydrocarbon is stored in propellant storage tank 20. The propellant flows from storage tank 20 via tube 43 to a two-way valve 46 and then to main heat exchanger tube 37. In addition to the propellant from storage tank 20, the instant invention utilizes the biowaste products from the spacecraft environmental control and life support system as an alternate or secondary propellant to achieve useful thrust and to further enhance the spacecraft performance. These biowaste products such as carbon dioxide and water from the atmospheric control system or a hydrocarbon such as methane or acetylene produced by the regeneration of oxygen from the biowaste products are stored in biowaste storage tank 22. A tube 48 allows the biowaste products to flow from storage tank 22 to valve 46 and then to main heat exchanger tube 37. The two-way valve 46 allows either the propellant or biowaste product to be used independently of each other. The main heat exchanger tube 37 further connects at the hot end to a manifold 44 and then to a plurality of the secondary heat exchanger tubes 38, each having a valve means such as solenoid valve 47 associated therewith in order to control the flow therethrough to nozzles 14.

MODE OF OPERATION

The instant invention utilizes the heat generated by the radioisotope heat source 40 or 40' (shown in FIG. 6) of the combined power and propulsion system 12 or 12', respectively, to heat a working fluid and a propellant. The primary propellant is stored in propellant storage tank 20 while the alternate or secondary propellant, in the form of biowaste products, is stored in biowaste storage tank 22. Either one of the propellants flow through valve 46 and, depending upon which system 12 or 12' is utilized, to either main heat exchanger tube 37 or 37', to the heat exchanger 18 or 18', wherein the propellant is superheated to higher and higher temperatures as it flows through the heat exchanger and then flows in its gaseous state to manifold 44, secondary tubes 38 and out the plurality of nozzles 14. Simultaneously as the propellants are superheated in the exchanger, the working fluid flows through heat exchanger tube 35 or 35' and back through the heat exchanger in a closed loop for power generation in the space vehicle 10.

It can therefore be clearly seen that the combined power and propulsion system of this invention has the following advantages over past propulsion systems:

(1) It combines two separate spacecraft systems into a single optimized system;

(2) It utilizes the biowaste products of the spacecraft as a secondary propellant; and (3) It eliminates the need of radiating excess heat to the atmosphere under throttled or no load conditions.

I claim:

1. A combined power and propulsion system for a space vehicle comprising a heat exchanger having an outer radiation shell, an inner shell having a heat source therein mounted in spaced relation within said outer shell by a spacer means, a working fluid storage tank, a first heat exchanger tube operatively connecting said fluid storage tank to said heat exchanger in a closed loop, a propellant storage tank, a biowaste storage tank, a valve, a first tube operatively connecting said propellant storage tank to said valve, a second tube operatively connecting said biowaste tank to said valve, a second heat exchanger tube being directly connected at one end to said valve, operatively connecting said valve to said heat exchanger and at least one nozzle of said space vehicle operatively connected to the other end of said second heat exchanger tube, whereby the working fluid in said working fluid storage tank is used to produce power in the space vehicle while the biowaste in said biowaste storage tank and the propellant in the propellant storage tank are used for propulsion of the space vehicle.

2. A combined power and propulsion system as defined in claim 1 wherein there is a manifold connected to the other end of said second heat exchanger tube, a plurality of nozzles operably connected to said manifold and a valve means located intermediate said manifold and nozzles for regulating the amount of flow therethrough.

3. A combined power and propulsion system as defined in claim 2 wherein said heat source is a radioisotope.

References Cited
UNITED STATES PATENTS

| | | | |
|---|---|---|---|
| 2,551,112 | 5/1951 | Goddard | 60—260 XR |
| 3,110,154 | 11/1963 | Edelbaum et al. | 60—202 |
| 3,188,799 | 6/1965 | Flynn | 176—39 XR |
| 3,315,471 | 4/1967 | Dailey et al. | 60—203 |
| 3,328,960 | 7/1967 | Martin | 60—202 |
| 3,329,532 | 7/1967 | Austin et al. | 60—203 XR |
| 3,353,354 | 11/1967 | Friedman et al. | 60—203 |

OTHER REFERENCES

Nucleonics, vol. 16, No. 3, March 1958 (p. 21 relied on).

CARLTON R. CROYLE, Primary Examiner

U.S. Cl. X.R.

60—267; 165—140, 154; 176—39